US012656455B2

(12) United States Patent
    Hasegawa

(10) Patent No.: US 12,656,455 B2
(45) Date of Patent: Jun. 16, 2026

(54) RADAR DEVICE

(71) Applicant: DENSO CORPORATION, Kariya-city (JP)

(72) Inventor: Yutaka Hasegawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 290 days.

(21) Appl. No.: 18/594,914

(22) Filed: Mar. 4, 2024

(65) Prior Publication Data

US 2024/0201326 A1    Jun. 20, 2024

Related U.S. Application Data

(63) Continuation of application No. PCT/JP2022/032877, filed on Aug. 31, 2022.

(30)        Foreign Application Priority Data

Sep. 6, 2021    (JP) ................................. 2021-144783

(51) Int. Cl.
    *G01S 7/40*        (2006.01)
    *G01S 7/35*        (2006.01)
    *G01S 13/42*        (2006.01)
(52) U.S. Cl.
    CPC ............ *G01S 7/4047* (2021.05); *G01S 7/354* (2013.01); *G01S 13/42* (2013.01)
(58) Field of Classification Search
    CPC .... G01S 13/343; G01S 13/42; G01S 13/4454; G01S 13/583; G01S 13/931; G01S 7/354; G01S 7/4039; G01S 7/4047; H01Q 1/42
    See application file for complete search history.

(56)        References Cited

U.S. PATENT DOCUMENTS

| 5,485,159 | A | * | 1/1996 | Zhang | G01S 7/4004 340/580 |
| 5,959,570 | A | * | 9/1999 | Russell | G01S 7/4004 700/301 |
| 6,414,623 | B1 | * | 7/2002 | Ashihara | G01S 7/4004 342/173 |
| 6,469,659 | B1 | * | 10/2002 | Lajiness | G01S 7/4004 342/91 |
| 7,342,532 | B1 | * | 3/2008 | Matsuoka | G01S 7/4004 342/174 |

(Continued)

*Primary Examiner* — Peter M Bythrow
(74) *Attorney, Agent, or Firm* — Precision Patents, P.C.

(57)        ABSTRACT

In a radar apparatus, a processing unit calculates a wavenumber of incoming waves reflected from a target object for each of detected target objects. The processing unit calculates, as a wavenumber evaluation value, a proportion of target objects of which the calculated wavenumber is plural among the all of the detected target objects. The processing unit calculates, as a false azimuth evaluation value, a proportion of target objects including a second incoming wave of which an azimuth difference relative to an azimuth of a first incoming wave of which power of the incoming wave is maximum power is a specific azimuth difference occurring due to periodic signal errors being superimposed on the virtual array, among the target objects of which the calculated wavenumber is plural. The processing unit determines contamination of the radome based on the wavenumber evaluation value and the false azimuth evaluation value.

2 Claims, 7 Drawing Sheets

(56)                    References Cited

U.S. PATENT DOCUMENTS

|  |  |  |  |  |  |
|---|---|---|---|---|---|
| 7,486,222 | B2 * | 2/2009 | Matsuoka | ............ | G01S 7/4004 |
|  |  |  |  |  | 343/872 |
| 10,310,065 | B2 * | 6/2019 | Okamoto | ................ | G01S 13/34 |
| 2006/0007036 | A1 * | 1/2006 | Natsume | ................... | G01S 3/74 |
|  |  |  |  |  | 342/107 |
| 2008/0129596 | A1 * | 6/2008 | Xin | .......................... | G01S 3/74 |
|  |  |  |  |  | 342/378 |
| 2009/0207079 | A1 * | 8/2009 | Samukawa | .......... | G01S 13/931 |
|  |  |  |  |  | 342/438 |
| 2015/0097718 | A1 * | 4/2015 | Sato | ...................... | G01S 7/4004 |
|  |  |  |  |  | 342/147 |
| 2015/0177303 | A1 * | 6/2015 | Ebling | ................. | G01S 7/4026 |
|  |  |  |  |  | 342/27 |
| 2020/0301006 | A1 * | 9/2020 | Namiki | ................... | G01S 13/30 |
| 2022/0221568 | A1 * | 7/2022 | Nishikido | ............ | G01S 17/931 |

* cited by examiner

VIRTUAL ARRAY WHEN M = 3 AND N = 2

FIG.8

|  |  | WAVENUMBER EVALUATION VALUE |  |  |
|---|---|---|---|---|
|  |  | LESS THAN THRESHOLD L | EQUAL TO OR GREATER THAN THRESHOLD L AND LESS THAN THRESHOLD H | EQUAL TO OR GREATER THAN THRESHOLD H |
| FALSE AZIMUTH EVALUATION VALUE | LESS THAN THRESHOLD L | RESET* | −1 | −1 |
|  | EQUAL TO OR GREATER THAN THRESHOLD L AND LESS THAN THRESHOLD H | −1 | −1 | ±0 |
|  | EQUAL TO OR GREATER THAN THRESHOLD H | −1 | ±0 | +1 |

RADAR DEVICE

CROSS-REFERENCE TO RELATED APPLICATIONS

The present application is a continuation application of International Application No. PCT/JP2022/032877, filed on Aug. 31, 2022, which claims priority to Japanese Patent Application No. 2021-144783, filed on Sep. 6, 2021. The contents of these applications are incorporated herein by reference in their entirety.

BACKGROUND

The present disclosure relates to a radar apparatus that detects a target object by transmitting and receiving radio waves through a plurality of antennas. In the radar apparatus, detecting contamination of a radome that protects an antenna unit provided therein is known. The radome covers opening surfaces of a plurality of antennas provided in the antenna unit.

SUMMARY

One aspect of the present disclosure provides a radar apparatus that includes a transmission antenna unit, an oscillation unit, a modulation unit, a reception antenna unit, a processing unit, and a radome. The transmission antenna unit includes a plurality of transmission antennas. The oscillation unit generates a common signal that is a continuous wave. The modulation unit generates a plurality of transmission signals to be inputted to the plurality of transmission antennas by performing a predetermined modulation on each of a plurality of branched signals obtained by branching the common signal into a same number as the number of transmission antennas. The reception antenna unit includes a plurality of reception antennas. The processing unit detects each target object reflecting the transmission wave from the transmission antenna based on a plurality of signal components corresponding to the plurality of transmission signals respectively extracted from a plurality of reception signals received by the reception antenna unit. The radome covers and protects from outside an opening surface of the plurality of transmission antennas and the plurality of reception antennas.

In the radar apparatus, a virtual array having a plurality of virtual reception antennas is formed by the plurality of transmission antennas and the plurality of reception antennas. The processing unit calculates a wavenumber of incoming waves reflected from the target object for each of the detected target objects. The processing unit calculates, as a wavenumber evaluation value, a proportion of target objects of which the calculated wavenumber is plural among the all of the detected target objects. The processing unit calculates, as a false azimuth evaluation value, a proportion of target objects including a second incoming wave of which an azimuth difference relative to an azimuth of a first incoming wave of which power of the incoming wave is maximum power is a specific azimuth difference occurring due to periodic signal errors being superimposed on the virtual array, among the target objects of which the calculated wavenumber is plural. The processing unit determines contamination of the radome based on the wavenumber evaluation value and the false azimuth evaluation value.

BRIEF DESCRIPTION OF THE DRAWINGS

In the accompanying drawings:

FIG. 8 is an explanatory diagram for explaining azimuth estimation error occurring as a result of contamination of a radome in a virtual array shown in FIG. 8;

DESCRIPTION OF THE EMBODIMENTS

Figure 1:
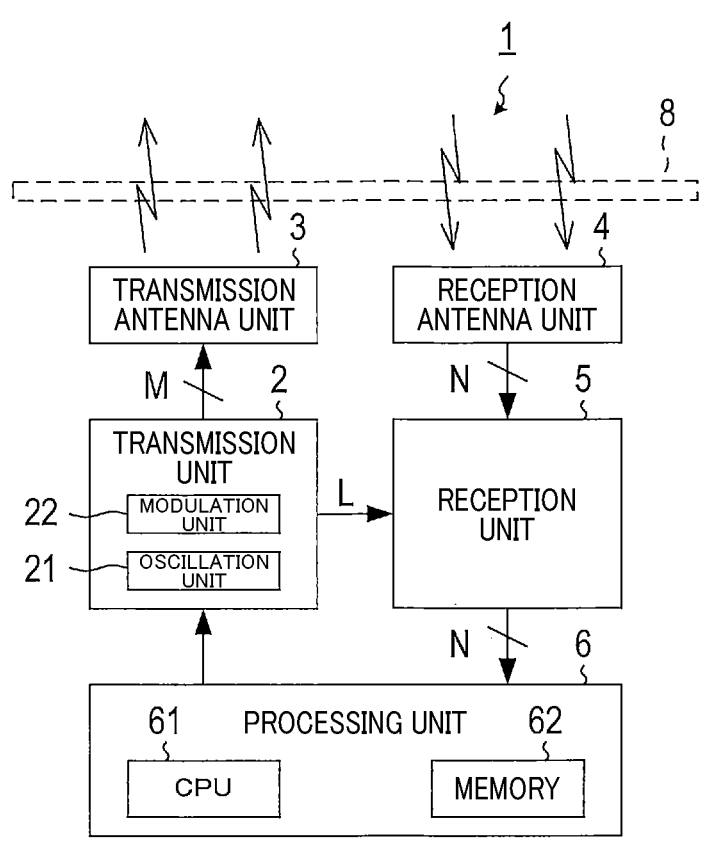
FIG. 1 is a block diagram illustrating a configuration of a radar apparatus according to an embodiment.

JP 5978754 B2 describes detecting contamination of a radome that protects an antenna unit by covering opening surfaces of a plurality of antennas in a radar apparatus.

In the radar apparatus, the wavenumber of incoming waves reflected by a transmission radio wave striking a target object is determined for each detected target object. Contamination of the radome is determined when a proportion of target objects having the wavenumber of incoming waves being plural among all target objects is equal to or greater than a predetermined proportion.

However, as a result of detailed examination by the inventors, an issue has been found in that, if contamination of the radome is determined only by the proportion of the target objects having the wavenumber of incoming waves being plural among all target objects as described above, contamination may be erroneously determined as a result of a calculation error in the proportion and the like.

It is thus desired to enable contamination of a radome of an antenna to be more accurately determined from the wavenumber of incoming waves from a detected target object in a radar apparatus and, in particular, a multiple-input multiple-output (MIMO) radar.

An exemplary embodiment of the present disclosure provides a radar apparatus that includes a transmission antenna unit, an oscillation unit, a modulation unit, a reception antenna unit, a processing unit, and a radome.

The transmission antenna unit includes a plurality of transmission antennas. The reception antenna unit includes a plurality of reception antennas. The oscillation unit generates a common signal that is a continuous wave. The modulation unit generates a plurality of transmission signals to be inputted to the plurality of transmission antennas by performing a predetermined modulation on each of a plurality of branched signals obtained by branching the common signal generated by the oscillation unit into the same number as the number of transmission antennas. Therefore, the plurality of transmission antennas emit radio waves by the transmission signals generated by the modulation unit.

The processing unit is configured to detect each target object reflecting the transmission wave from the transmission antenna based on a plurality of signal components corresponding to the plurality of transmission signals respectively extracted from a plurality of reception signals received by the reception antenna unit. The radome covers and protects an opening surface of the plurality of transmission antennas and the plurality of reception antennas.

In the radar apparatus of the exemplary embodiment, a virtual array having a plurality of virtual reception antennas is formed by the plurality of transmission antennas and the plurality of reception antennas. Therefore, the radar apparatus of the exemplary embodiment is a MIMO radar. MIMO is an acronym for Multiple-Input Multiple-Output.

In addition, next, the processing unit includes a wavenumber calculation unit, a wavenumber evaluation value calculation unit, a false azimuth evaluation value calculation unit, and a contamination determining unit.

The wavenumber calculation unit calculates the wavenumber of incoming waves reflected from the target object for each target object detected by the processing unit.

The wavenumber evaluation value calculation unit calculates, as the wavenumber evaluation value, a proportion of target objects of which the wavenumber calculated by the wavenumber calculation unit is plural among all target objects detected by the processing unit.

The false azimuth evaluation value calculation unit calculates, as a false azimuth evaluation value, a proportion of target objects including a second incoming wave of which an azimuth difference relative to an azimuth of a first incoming wave of which power of the incoming wave is maximum power is a specific azimuth difference occurring due to periodic signal errors being superimposed on the virtual array, among the target objects of which the wavenumber calculated by the wavenumber calculation unit is plural.

Furthermore, the contamination determining unit determines contamination of the radome based on the wavenumber evaluation value and the false azimuth evaluation value.

In this manner, in the radar apparatus of the exemplary embodiment, the false azimuth evaluation value is used in addition to the wavenumber evaluation value that is the proportion of target objects of which the wavenumber of incoming waves from the target object is plural among all target objects detected by the processing unit in contamination determination for the radome.

A reason for this is that, in the MIMO radar, if the radome is contaminated, because differing error signals are superimposed for each of the transmission antennas configuring the transmission antenna unit, periodic signal errors are superimposed on the virtual array under physical conditions such as intervals between transmission antennas.

That is, when the periodic signal errors are superimposed on the virtual array, the azimuth difference of the incoming waves is the specific azimuth difference. Therefore, in the radar apparatus the exemplary embodiment, the false azimuth evaluation calculation unit calculates the proportion of the target objects including the second incoming wave of which the azimuth difference relative to the azimuth of the first incoming wave is the specific azimuth difference among the target objects of which the wavenumber of incoming waves is plural as the false azimuth evaluation value. The false azimuth evaluation value is used in contamination determination.

As a result, in the radar apparatus of the exemplary embodiment, contamination of the radome can be more accurately determined in the MIMO radar. As a result of a user being notified of the determination result thereof, detection error of a target object occurring as a result of the radome being contaminated can be reduced.

An embodiment of the present disclosure will hereinafter be described together with the drawings.

A radar apparatus 1 according to the present embodiment is mounted in a vehicle and detects various target objects present in the vicinity of the vehicle. The radar apparatus 1 is a MIMO radar that simultaneously transmits and receives radio waves through a plurality of antennas.

As shown in FIG. 1, the radar apparatus 1 includes a transmission unit 2, a transmission antenna unit 3, a reception antenna unit 4, a reception unit 5, and a processing unit 6.

The transmission antenna unit 3 has M transmission antennas. Mis an integer of 2 or greater. The transmission antennas are arranged in a row along an array direction set in advance. According to the present embodiment, the array direction is a width direction of the vehicle.

The reception antenna unit 4 has N reception antennas. N is an integer of 2 or greater. The reception antennas are arranged along the same direction as the array direction of the transmission antennas.

In addition, the transmission antenna unit 3 and the reception antenna unit 4 are provided with a radome 8 that covers an overall opening surface that is an emission surface for radio waves of the plurality of transmission antennas and the plurality of reception antennas, and protects the antennas.

Figure 2:
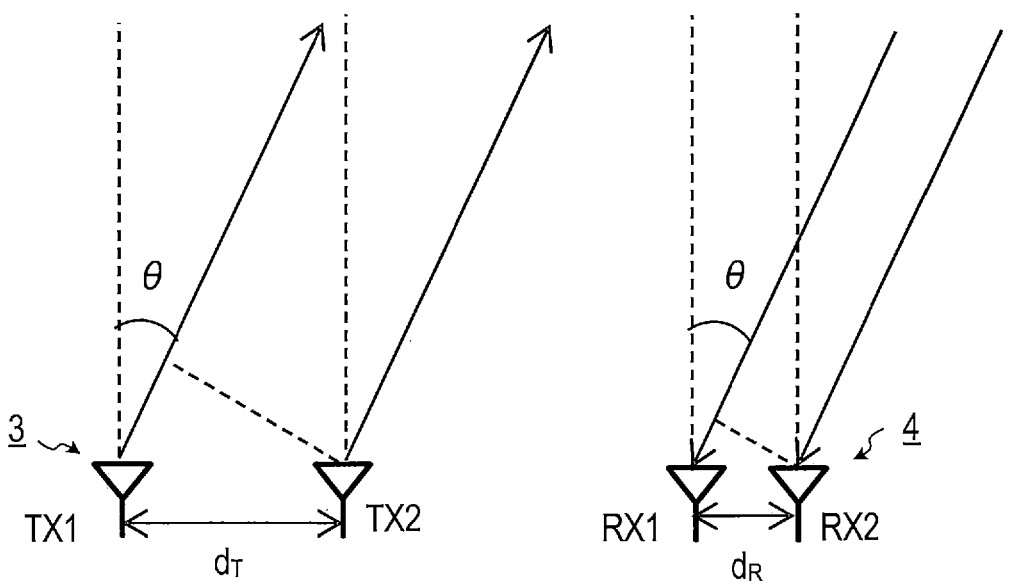
FIG. 2 is a diagram illustrating a relationship between a transmission antenna, a reception antenna, and a target object.

Here, signals received by the reception antennas when M=2 and N=2 will be described. As shown in FIG. 2, it is presumed that a target object to be detected is present in a direction slanted at an angle θ relative to a front direction of the transmission antenna unit 3 and the reception antenna unit 4. In addition, an interval between a transmission antenna TX1 and a transmission antenna TX2 is an interval dT, and an interval between a reception antenna RX1 and a reception antenna RX2 is an interval dR. Furthermore, a reflection coefficient at the target object is D, a phase change of a signal on a path from the transmission antenna TX1 to the target object is expressed by αT, and a phase change of a signal on a path from the target object to the reception antenna RX1 is αR. Here, αT and αR are expressed by complex numbers.

In this case, a signal transmitted from the transmission antenna TX1 and received by the reception antenna RX1 is expressed by expression (1). A signal transmitted from the transmission antenna TX1 and received by the reception antenna RX2 is expressed by expression (2). A signal transmitted from the transmission antenna TX2 and received by the reception antenna RX1 is expressed by expression (3). A signal transmitted from the transmission antenna TX2 and received by the reception antenna RX2 is expressed by expression (4).

$$\alpha_T \cdot D \cdot \alpha_R \tag{1}$$

$$\alpha_T \cdot D \cdot \alpha_R \cdot \exp(jkd_R\sin\theta) \tag{2}$$

$$\alpha_T \cdot D \cdot \alpha_R \cdot \exp(jkd_T\sin\theta) \tag{3}$$

$$\alpha_T \cdot D \cdot \alpha_R \cdot \exp(jk(d_T + d_R)\sin\theta) \tag{4}$$

Figure 3:
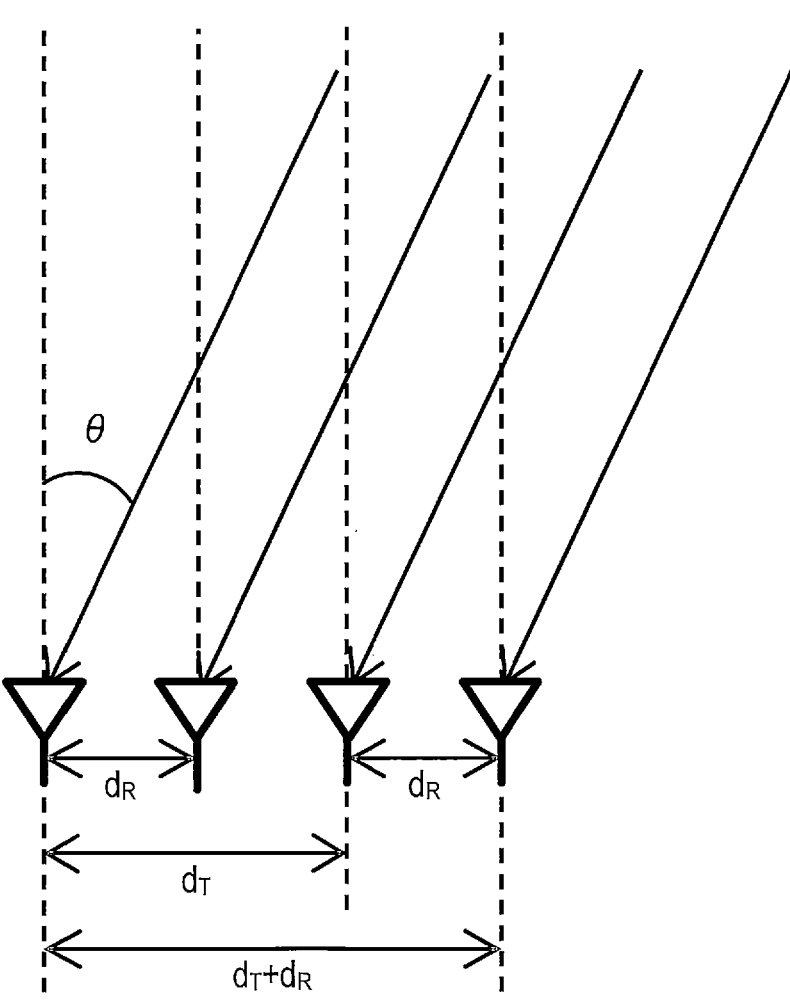
FIG. 3 is a diagram illustrating an arrangement of reception antennas in a virtual array.

These expressions are equivalent to a case in which, as shown in FIG. 3, four reception antennas are arrayed in positions at which distances from one reception antenna serving as a reference are dR, dT, dT+dR, respectively. In FIG. 3, the reception antenna positioned leftmost serves as the reference. Virtual reception antennas (hereafter, virtual reception antennas) that are arrayed in this manner are referred to as a virtual array.

In a MIMO radar, through use of the virtual array, an angular resolution equal to that in a case in which one transmission antenna and (M×N) reception antennas are provided is implemented by (M+N) transmission antennas and reception antennas.

Figure 4:
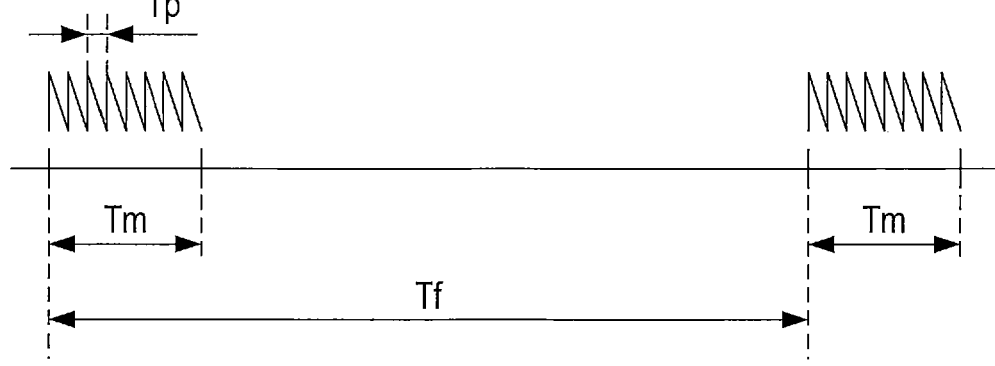
FIG. 4 is a diagram illustrating a chirp repetition cycle.

As shown in FIG. 1, the transmission unit 2 includes an oscillation unit 21 and a modulation unit 22. The oscillation unit 21 generates a common signal that is a continuous wave. The oscillation unit 21 provides the generated common signal to the modulation unit 22 and also provides the generated common signal as a local signal L to the reception unit 5. In addition, as shown in FIG. 4, the oscillation unit 21 repeatedly generates a chirp signal of which a frequency continuously changes at every repetition cycle Tp (such as 50 μs) during a leading measurement period Tm (such as 10 ms) of each frame with a measurement cycle Tf (such as 50 ms) as a single frame.

The oscillation unit 21 is configured to be capable of changing the measurement cycle Tf, the measurement period Tm, and the repetition cycle Tp as appropriate based on instructions from the processing unit 6. Here, a frequency width of the chirp signal changed during the repetition cycle is fixed regardless of the repetition cycle Tp. That is, the configuration is such that a change rate Δf of the frequency of the chirp signal is changed by the repetition cycle Tp being changed.

In addition, an allowable range of the repetition cycle Tp, and further, an allowable range of the change rate Δf of the frequency of the chirp signal are set such that a frequency deviation occurring based on a relative speed to the target object is small when a beat signal generated by the transmission signal and the reception signal being mixed is analyzed. Specifically, the frequency deviation occurring based on the relative speed to the target object is set to be small enough to be ignored compared to the frequency deviation occurring based on a distance to the target object.

The modulation unit 22 branches the common signal generated by the oscillation unit 21 and generates M branched signals that is the same number as the number of transmission antennas belonging to the transmission antenna unit 3. For each of the M branched signals, the modulation unit 22 performs phase-shift keying that changes the phase of the branched signal at each repetition cycle Tp. As a result, M transmission signals to be respectively provided to the transmission antennas is generated. In phase-shift keying, a phase rotation amount Δφ of a magnitude that differs from others is set for each of the M branched signals, and at every repetition cycle, the phase of the branched signal is rotated by the phase rotation amount Δφ.

Here, the number of phases used in phase-shift keying is P. P is an integer greater than M. The modulation unit 22 uses P types of phase rotation amounts expressed by Δφ=p× 360°/P with p=0, 1, 2, . . . P−1. For example, when P=4, Δφ=0° at p=0 and a phase difference of the transmission signal that is the signal after modulation relative to the branched signal (that is, the common signal) that is the signal before modulation is 0° at all repetition cycles Tp. When p=1, Δφ=90°, the phase difference of the transmission signal relative to the common signal changes at each repetition cycle Tp and changes in the following order: 0°→90°→180°→270°→0° (similarly applies hereafter).

When p=2, Δφ=180°, the phase difference of the transmission signal relative to the common signal changes at each repetition cycle and changes in the following order: 0°→180°→0°→180° →0° (similarly applies hereafter). When p=3, Δφ=270°, the phase difference of the transmission signal relative to the common signal changes at each repetition cycle and changes in the following order: 0°→270°→180°→90°→0° (similarly applies hereafter).

Because P>M as described above, not all types of the P types of phase rotation amounts Δφ are used in phase-shift keying. A portion thereof used.

The modulation unit 22 is configured to be capable of changing as appropriate a setting of the number of phases P, selection of the M types of phase rotation amounts used in phase-shift keying among the P types of phase rotation amounts Δp, and a setting of a corresponding relationship between the selected M types of phase rotation amounts and the M transmission antennas.

As shown in FIG. 1, the reception unit 5 generates the beat signal that is a difference signal with the local signal L for each of the N reception signals outputted from the reception antennas belonging to the reception antenna unit 4. The reception unit 5 samples the generated beat signals and provides the sampled beat signals to the processing unit 6.

The processing unit 6 is an electronic control apparatus mainly configured by a known microcomputer including a central processing unit (CPU) 61, a memory 62, and the like. For example, the memory 62 may be a read-only memory (ROM) or a random access memory (RAM). Various functions of the microcomputer are implemented by the CPU 61 implementing a program stored in a non-transitory computer-readable (tangible) storage medium. In this example, the memory 62 may correspond to the non-transitory computer-readable (tangible) storage medium storing the program.

In addition, as a result of the program being implemented, a method corresponding to the program is performed. Here, some or all of the functions performed by the CPU 61 may be configured by hardware by one or a plurality of integrated chips (IC). In addition, the processing unit 6 may be configured by one or a plurality of microcomputers.

Figure 5:
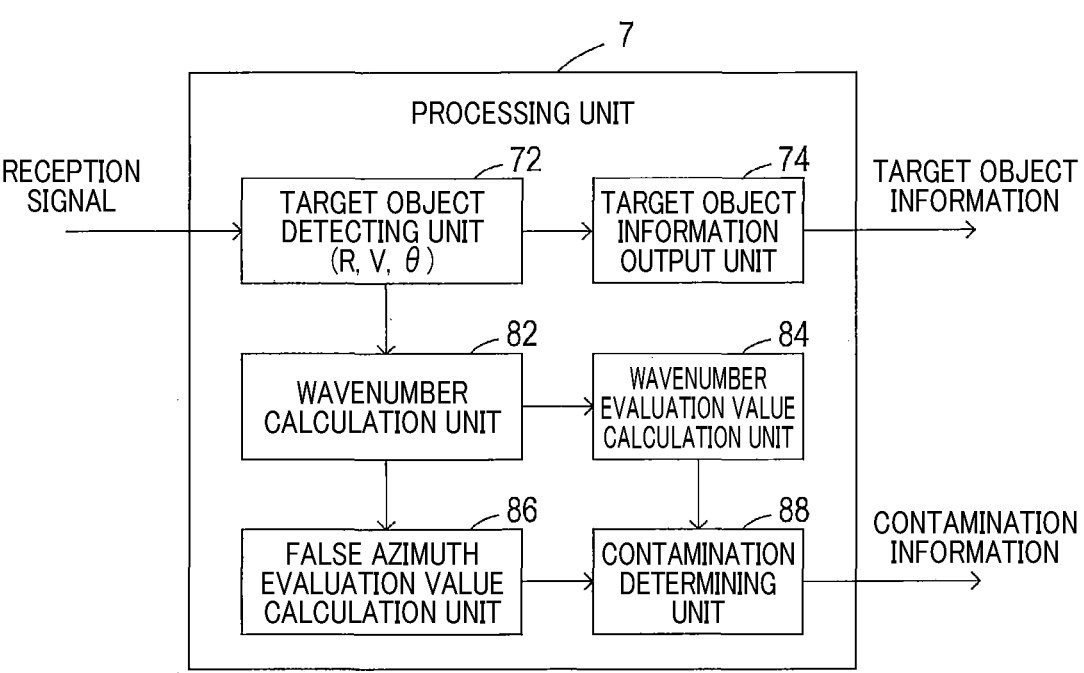
FIG. 5 is a block diagram illustrating a functional configuration of a processing unit.

Next, as shown in FIG. 5, the processing unit 6 includes a target object detector 72, a target object information output unit 74, a wavenumber calculation unit 82, a wavenumber evaluation value calculation unit 84, a false azimuth evaluation value calculation unit 86, and a contamination determining unit 88 as a functional configuration.

The target object detector 72 sets the repetition cycle Tp that is a parameter related to the common signal generated by the oscillation unit 21, and the number of phases P used in phase-shift keying by the modulation unit 22. In addition, the target object detector 72 selects the M types of phase rotation amounts used in phase-shift keying by the modulation unit 22 among the P types of phase rotation amounts determined by the number of phases P, and sets a corresponding relationship between the selected M types of phase rotation amounts and the transmission antennas.

Then, the transmission unit 2 is operated based on the setting results set in this manner, and radar measurement is performed. Specifically, the transmission unit 2 is made to repeatedly transmit the chirp signal at each repetition cycle Tp during the measurement period Tm, and sampling results of the beat signals generated from the reception signals of the chirp signals is acquired. Hereafter, the number of chirp signals repeatedly transmitted during the measurement period Tm is K.

Next, the sampling results of the beat signals acquired from the N reception antennas are frequency-analyzed for each chirp signal and for each reception antenna, and K distance spectrums each is calculated for each of the N reception antennas. In each distance spectrum, a peak appears at a frequency based on an amount of time required to travel to and from the target object that has reflected the transmission signal transmitted from the transmission antenna (that is, a distance to the target object).

In addition, the target object detector 72 calculates a speed spectrum for each reception antenna using (N×K) distance spectrums. Specifically, the target object detector 72 extracts signals of the same frequency from the K distance spectrums related to the subject reception antenna and performs a frequency analysis process in a time axis direction on the extracted signals.

As a result, a two-dimensional spectrum (hereafter, a reception spectrum) indicating a distance and a relative speed to the target object that has reflected the radar wave is generated for each reception antenna. Then, the target object detector 72 integrates the reception spectrums respectively generated for the reception antennas and thereby generates a detection result in which a peak in a power spectrum is generated for each target object in a coordinate system of a distance R to the target object and a relative speed V to the target object.

In addition, the target object detector 72 extracts peaks corresponding to the same target object of which the distance R and the relative speed V are the same from each of the reception spectrums respectively calculated for the reception antennas. Then, the target object detector 72 performs a known azimuth detection process, such as the MUSIC method, a beamformer method, or the Capon method, on the extracted peaks and calculates an azimuth θ of each target object. Here, MUSIC is an acronym for Multiple Signal Classification.

The target object detector 72 outputs the azimuth θ, the distance R, and the relative speed V of each target object calculated as described above to the target object information output unit 74 as target object information of each target object, and makes the target object information output unit 74 output the target object information to an external apparatus such as a driving assistance apparatus of the vehicle. Here, target object detection in a MIMO radar such as this is described, for example, in JP 2019-128235 A and is a known technology. Therefore, a more detailed description is omitted.

Next, the wavenumber calculation unit 82 calculates the wavenumber of incoming waves from each target object obtained when the target object detector 72 determines the azimuth θ for each target object in the azimuth detection process, such as the MUSIC method, the beamformer method, or the Capon method.

In addition, the wavenumber evaluation value calculation unit 84 calculates a proportion of target objects of which the wavenumber calculated by the wavenumber calculation unit 82 is plural among all target objects detected by the target object detector 72 as the wavenumber evaluation value.

Furthermore, the false azimuth evaluation value calculation unit 86 calculates a proportion of target objects including a second incoming wave of which an azimuth difference relative to a first incoming wave of which power of the incoming wave is maximum is a specific azimuth difference among the target objects of which the wavenumber calculated by the wavenumber calculation unit 82 is plural as a false azimuth evaluation value.

Then, the contamination determining unit 88 determines whether the radome 8 is contaminated based on the wavenumber evaluation value calculated by the wavenumber evaluation value calculation unit 84 and the false azimuth evaluation value calculated by the false azimuth evaluation value calculation unit 86, and outputs the determination result to an external apparatus such as a driving assistance apparatus of the vehicle. Here, contamination of the radome 8 determined by the contamination determining unit 88 includes attachment of water on the radome 8, icing of the radome 8, and the like.

Next, the false azimuth evaluation value calculation unit 86 will be described.

First, the specific azimuth difference is a fixed azimuth difference (such as 14° to) 16° that occurs as a result of periodic signal errors being superimposed on the virtual array.

Figure 7:
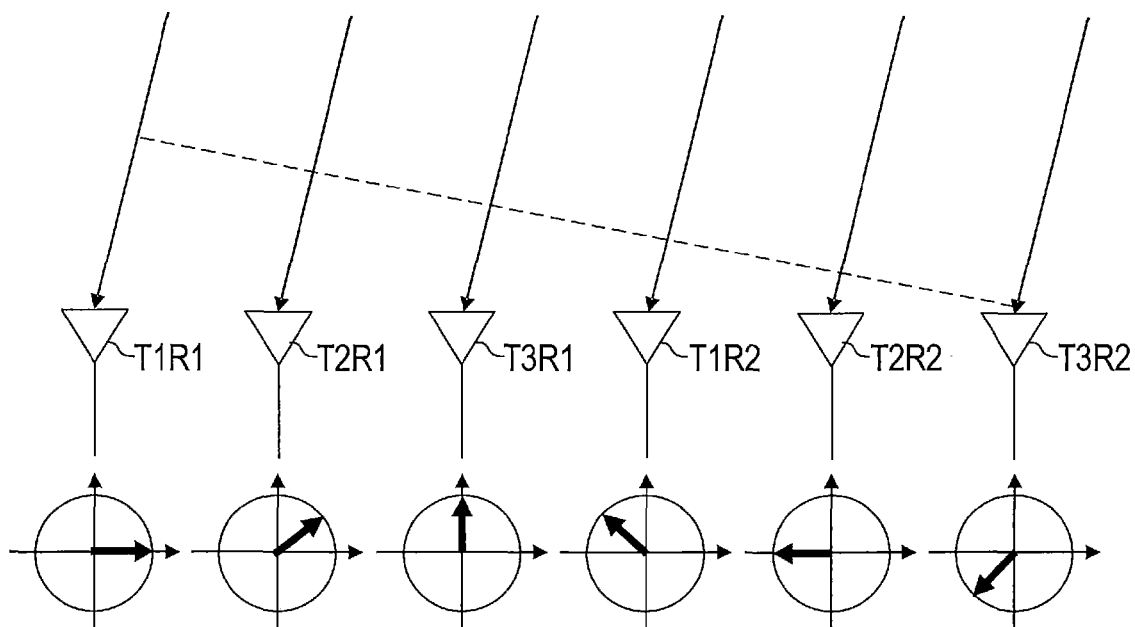
FIG. 7 is an explanatory diagram illustrating a virtual array in a case of three transmission antennas and two reception antennas.

For example, in a case in which the number of transmission antennas is M=3 and the number of reception antennas is N=2, the virtual array is configured by six virtual reception antennas T1R1 to T3R2 shown in FIG. 7 by combinations of transmission antennas T1, T2, and T3 and reception antennas R1 and R2.

Then, if the radome 8 becomes contaminated, differing error signals are superimposed on the transmission waves from the transmission antennas T1 to T3. Therefore, the reception signals of the six virtual reception antennas T1R1 to T3R2 respectively include the error signals of the corresponding transmission antennas T1 to T3.

Here, in the virtual reception antennas T1R1 to T3R2, as shown in FIG. 7, radio waves incident from a specific direction are reception signal having the same amplitude (r) and of which the phase (θ) is proportional to an antenna interval (x). Therefore, the reception signal is expressed as below. Here, the reception signal is an ideal signal shown in FIG. 8.

$$r \cdot \exp^{i\theta x}$$

Next, when an error signal S(Φ) of a specific cycle (Φ) is superimposed on the reception signal, that is, the ideal signal, the reception signal is expressed as below. Here, the reception signal is a reception signal shown in FIG. 8.

$$S(\Phi) \cdot r \cdot \exp^{i\theta x}$$

Figure 8:
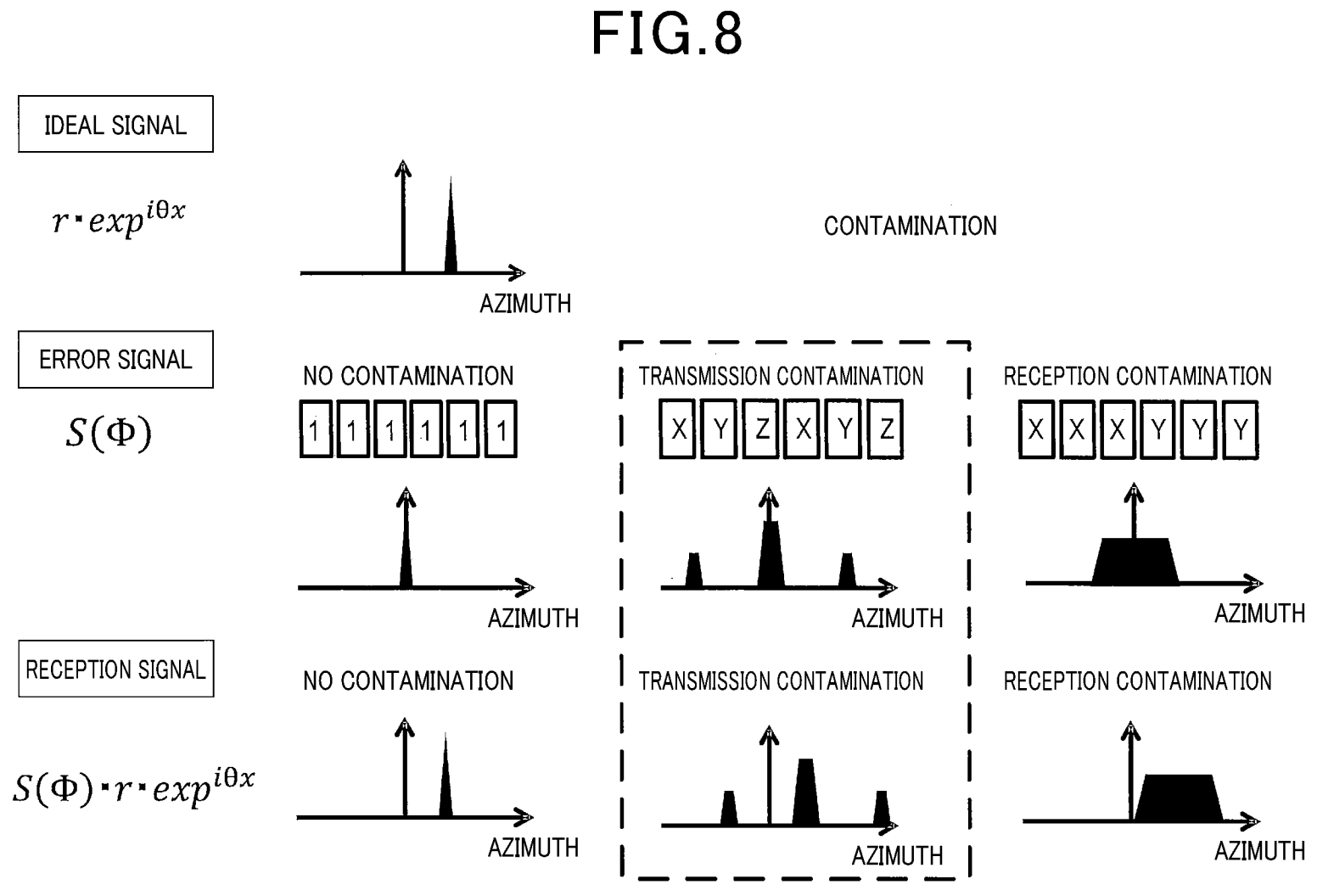

When the radome 8 is not contaminated, the error signals are not superimposed on the reception signals of the virtual reception antennas T1R1 to T3R2. Therefore, as shown in FIG. 8, the error signal is S(Φ)=1 and the reception signals from the virtual reception antennas T1R1 to T3R2 are ideal signals. Therefore, in this case, the azimuth of the incoming wave is accurately detected from the reception signals of the virtual reception antennas T1R1 to T3R2.

In contrast, when the radome 8 is contaminated and the error signals are superimposed on the transmission waves from the transmission antennas T1 to T3, the error signals differ for the transmission antennas T1 to T3, and S(Φ)=X, Y, and Z.

Therefore, error signals X, Y, Z, X, Y, Z are respectively superimposed on the reception signals from the virtual reception antennas T1R1, T2R1, T3R1, T1R2, T2R2, and T3R2. Periodic signal errors are superimposed on the virtual array. In addition, as a result of the periodic signal errors, the azimuths of the incoming waves from the target object vary. The azimuth difference thereof is a substantially fixed angle, that is, a specific azimuth difference under physical conditions such as the intervals between the transmission antennas T1 to T3.

Therefore, the false azimuth evaluation value calculation unit 86 determines that the azimuth is erroneously detected as a result of contamination of the radome 8 for the target object that includes the second incoming wave of which the azimuth difference relative to the azimuth of the first incoming wave of which the power of the incoming wave is maximum power is the specific azimuth difference, among the target objects of which the wavenumber of incoming waves is plural.

In addition, the false azimuth evaluation value calculation unit 86 calculates the proportion of the target objects of which the azimuth is erroneously detected as a result of contamination of the radome 8 among the target objects of which the wavenumber of incoming waves is plural as the false azimuth evaluation value. When the proportion is great, the likelihood of the radome 8 being contaminated is high. Therefore, the false azimuth evaluation value serves as a parameter suitable for determining contamination of the radome 8.

Here, as shown in FIG. 8, if the radome 8 is contaminated only on the reception antenna side rather than the transmission antenna side, a differing signal error is merely superimposed for each of the reception antennas R1 and R2. Therefore, contamination of the radome 8 cannot be determined.

Next, a contamination determination process performed by the CPU 61 to actualize functions as the wavenumber calculation unit 82, the wavenumber evaluation value calculation unit 84, the false azimuth evaluation value calculation unit 86, and the contamination determining unit 88 will be described with reference to a flowchart in FIG. 9.

Here, the contamination determination process is a process that is periodically performed by the CPU 61 every time the target object detection process serving as the target object detector 72 is performed, or in other words, synchronously with the target object detection process. The contamination determination process is performed by the CPU 61 implementing a program stored in the memory 62.

Figure 6:
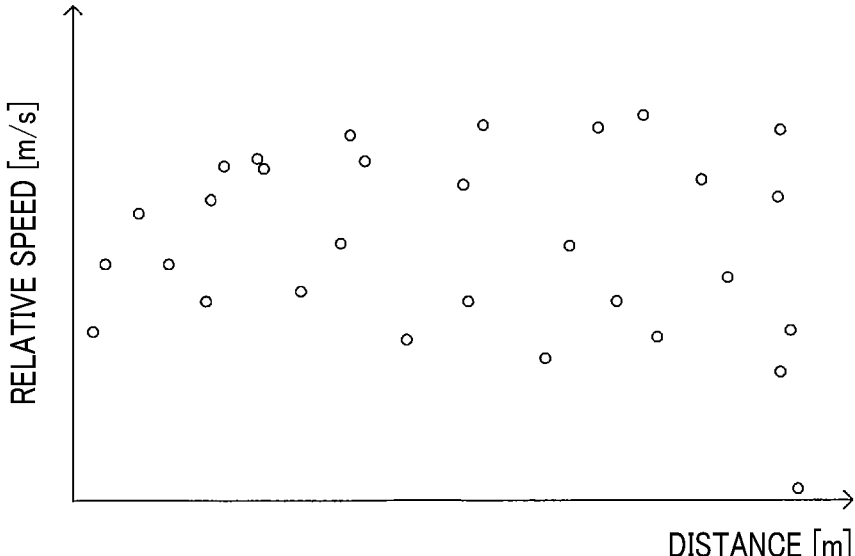
FIG. 6 is an explanatory diagram illustrating an example of detection results for a target object by a target object detector.
Figure 9:
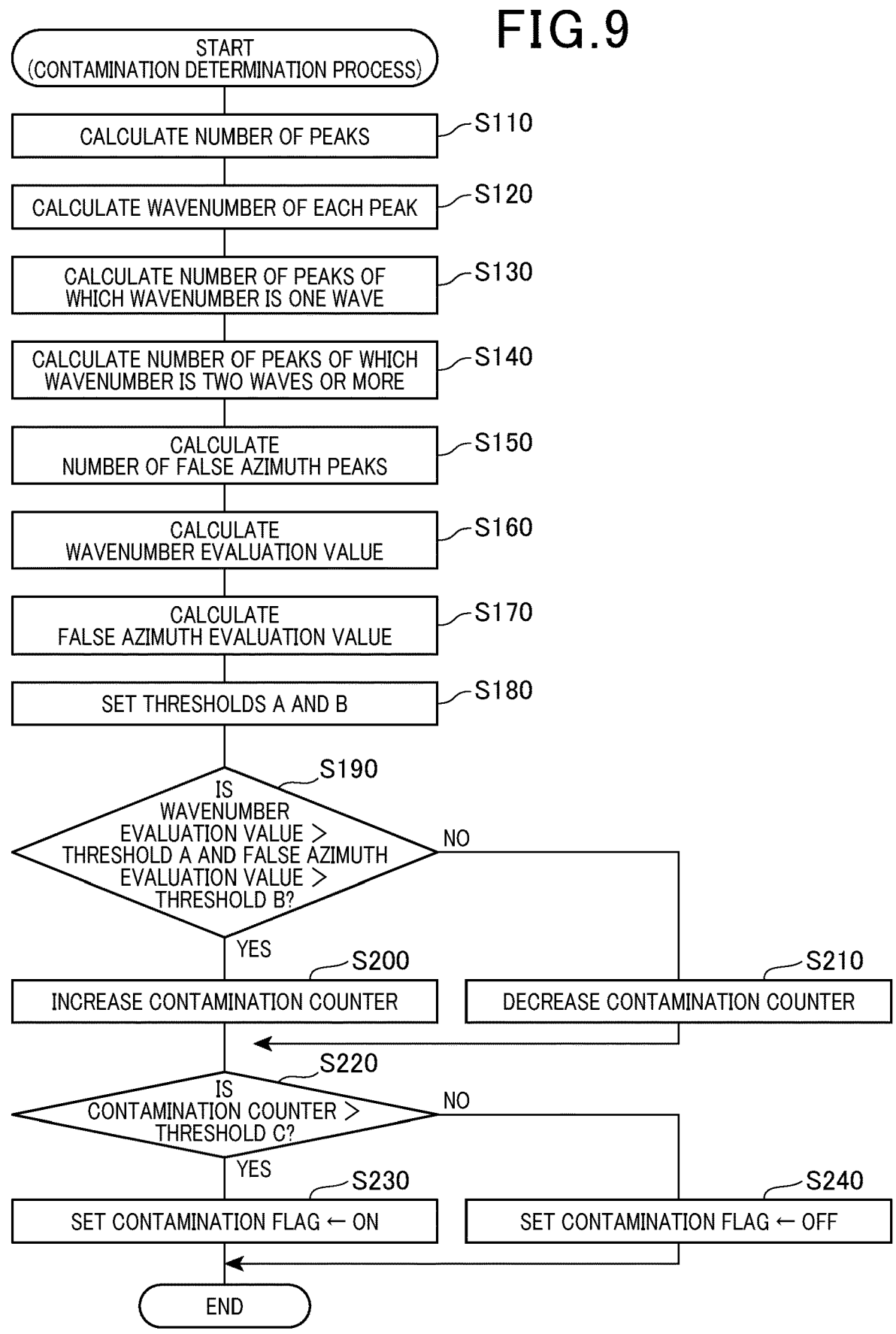
FIG. 9 is a flowchart illustrating a contamination determination process performed by a processing unit.

As shown in FIG. 9, in the contamination determination process, first, at S110, the number of target objects detected by the target object detector 72, that is, the number of power spectrums (hereafter, the number of peaks) in which a peak level has reached a target object determination level in the coordinate system of the distance R and relative speed V shown in FIG. 6 is calculated.

Next, at S120, a process serving as the wavenumber calculation unit 82 in which the wavenumber of incoming waves is calculated for each peak (that is, target object) of which the number of peaks was calculated at S120 is performed.

Figures 10, 11:
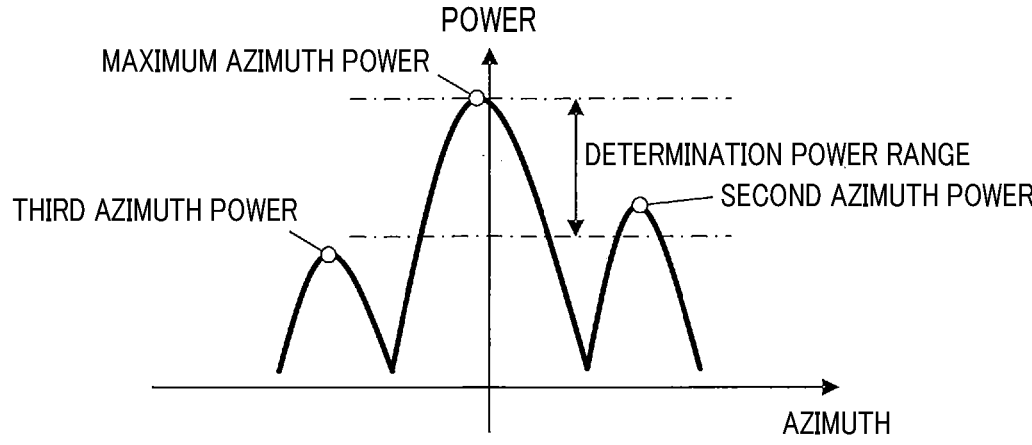
FIG. 10 is an explanatory diagram for explaining a method for calculating the wavenumber by an amplitude ratio of a spectrum.
FIG. 11 is an explanatory diagram for explaining increase and decrease values of a counter set based on the wavenumber evaluation value and a false azimuth evaluation value.

For example, in the target object detector 72, when the azimuth detection is performed by the beamformer method or the Capon method, as shown in FIG. 10, an azimuth spectrum in which the level changes based on the azimuth can be obtained.

Therefore, at S120, in the azimuth spectrum, a spectrum that has a peak within a determination power range set in advance relative to a maximum azimuth power at which the peak of the spectrum is maximum is calculated, and the number of peaks is calculated as the wavenumber of incoming waves.

For example, in FIG. 10, a second azimuth power is within the determination power range and a third azimuth power is outside the determination power range. Therefore, the number of spectrums of the first azimuth power and the second azimuth power=2 is calculated as the wavenumber of incoming waves.

Next, at S130, the number of peaks of which the wavenumber is one wave among all peaks for which the wavenumber is calculated at S120 is calculated. In addition, at S140, the number of peaks of which the wavenumber is two waves or more among all peaks for which the wavenumber is calculated at S120 is calculated.

Furthermore, at S150, the number of peaks including the second incoming wave of which the azimuth difference with the first incoming wave of which the power of the incoming wave is maximum power among the peaks of which the wavenumber is two waves or more is calculated as the number of false azimuth peaks.

Then, at S160, from the number of all peaks CPA, the number of peaks of which the wavenumber is one wave CP1, and the number of peaks of which the wavenumber is two waves or more CP2 calculated at S110, S130, and S140, a proportion of peaks of which the wavenumber is two waves or more among all peaks is calculated as the wavenumber evaluation value. Here, for example, the wavenumber evaluation value may be calculated as the wavenumber evaluation value=(CP2−CP1)/CPA.

In addition, next, at S170, the false azimuth evaluation value is calculate using the number of peaks of which the wavenumber is two waves or more CP2 calculated at S140 and the number of false azimuth peaks CPD calculated at S150. Here, for example, the false azimuth evaluation value may be calculated as the false azimuth evaluation value=CPD/CP2.

Therefore, in the flowchart shown in FIG. 9, the processes at S130, S140, and S160 function as the wavenumber evaluation value calculation unit 84 and the processes at S140, S150, and S170 function as the false azimuth evaluation value calculation unit 86.

Next, at S180, thresholds A and B used to determine contamination of the radome 8 are set based on the wavenumber evaluation value and the false azimuth evaluation value. At S180, an ordinary value, such as a value 0.5, is set as the thresholds A and B during ordinary operation.

In addition, in an environment in which the likelihood of the radome 8 freezing is high, for example, a value 0 may be set as the threshold A for the wavenumber evaluation value and a value 0.2 may be set as the threshold B for the false azimuth evaluation value so that contamination of the radome 8 is easily determined.

Here, as an environment in which the likelihood of the radome 8 freezing is high, during low temperature in which the temperature outside the vehicle, that is, the outside temperature is equal to or less than a predetermined temperature (such as 5° C.), or when a heater that heats a member in the vicinity of the radar apparatus 1 such as an emblem is being driven can be given. Therefore, at S180, the thresholds A and B are set to values smaller than the ordinary value during low outside temperature or when the heater is driven.

Next, at S190, whether the wavenumber evaluation value is greater than the threshold A and the false azimuth evaluation value is greater than the threshold B is determined. Then, when the wavenumber evaluation value>threshold A and the false azimuth evaluation value>threshold B, the process proceeds to S200 and a contamination counter is incremented (+1). Otherwise, the process proceeds to S210 and the contamination counter is decremented (−1).

When the value of the contamination counter is updated in this manner, at S220, whether the value of the contamination counter is greater than a threshold C set in advance is determined. Then, when the value of the contamination counter is greater than the threshold C, the radome 8 is determined to be contaminated and the process proceeds to S230.

Then, at S230, as a result of the contamination flag being set to on, contamination of the radome 8 is stored and the contamination determination process is ended. In addition, at S220, when determined that the value of the contamination counter is equal to or less than the threshold C, the process proceeds to S240. The contamination flag is set to off and the contamination determination process is ended.

Here, the processes at S180 to S240 function as the contamination determining unit 88. In addition, the process at S180 corresponds to a threshold setting unit of the present disclosure. The processes at S190 to S210 correspond to a contamination determination value updating unit of the present disclosure. The contamination counter corresponds to a contamination determination value of the present disclosure.

As described above, in the radar apparatus 1 according to the present embodiment, the wavenumber evaluation value and the false azimuth evaluation value are used in contamination determination for the radome 8. Of these, the wavenumber evaluation value is the proportion of target objects of which the number of the incoming waves from the target object is two waves or more among the target objects detected by the target object detector 72.

Conversely, the false azimuth evaluation value is the proportion of target objects of which the azimuth difference between two waves is the specific azimuth difference, that is, target objects of which the incoming waves are likely to have been erroneously detected as being two waves or more as a result of contamination of the radome 8 among the target objects of which the number of the incoming waves is two waves or more.

Therefore, in the radar apparatus 1 according to the present embodiment, compared to an apparatus in which the contamination of the radome 8 is determined merely by the wavenumber evaluation value, contamination of the radome 8 can be determined with high accuracy. In addition, the determination result regarding the contamination of the radome 8 is outputted to an external apparatus such as the driving assistance apparatus of the vehicle. Therefore, the user can be notified of contamination of the radome 8 through the external apparatus and the contamination of the radome 8 can be resolved. Consequently, detection error of a target object occurring as a result of the radome 8 being contaminated can be reduced.

An embodiment of the present disclosure is described above. However, the present disclosure is not limited to the above-described embodiment and various modifications are possible.

For example, according to the above-described embodiment, the contamination counter used to determine contamination of the radome 8 is described as that which is increased when the wavenumber evaluation value is greater than the threshold A and the false azimuth evaluation value is greater than the threshold B, and otherwise decreased.

In contrast, the threshold A and the threshold B for the wavenumber evaluation value and the false azimuth evaluation value may be set to threshold values H and L of two types, high and low. In this case, as shown in an example in FIG. 11, when either of the wavenumber evaluation value and the false azimuth evaluation value is equal to or greater than the threshold H, and the other of the wavenumber evaluation value and the false azimuth evaluation value is equal to or greater than the threshold L and less than the threshold H, an update value of the contamination counter can be set to a value 0 and update can be interrupted. Consequently, compared to the above-described embodiment, update of the contamination counter can be suppressed. In addition, in this case, when both the wavenumber evaluation value and the false azimuth evaluation value are less than the threshold L, the contamination counter can be reset.

Next, according to the above-described embodiment, the description is given using a so-called Doppler-division multiplex (DDM) type MIMO radar that generates the transmission signal to be provided to each transmission antenna by performing phase-shift keying for each of the M branched signals that is the same number as the number of transmission antennas as an example of the radar apparatus 1.

However, the present disclosure can achieve similar effects through application similar to that above as long as the radar is a MIMO radar. The modulation method for the transmission signal is not limited to phase-shift keying. That is, for example, the radar apparatus of the present disclosure may be a frequency division multiple access (FDMA) type MIMO radar that divides transmission signals by frequency or a time division multiple access (TDMA) type MIMO radar that divides transmission signals by time.

The processing unit 6 and the method thereof described in the present disclosure may be implemented by a dedicated computer that is provided so as to be configured by a processor and a memory, the processor being programmed to provide one or a plurality of functions that are realized by a computer program. Alternatively, the processing unit 6 and the method thereof described in the present disclosure may be implemented by a dedicated computer that is provided by a processor being configured by a single dedicated hardware logic circuit or more. Still alternatively, the processing unit 6 and the method thereof described in the present disclosure may be implemented by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory computer-readable (tangible) storage medium that can be read by a computer as instructions performed by the computer. The method for actualizing functions of sections included in the processing unit 6 is not necessarily required to include software. All functions thereof may be implemented using one or a plurality of pieces of hardware.

A plurality of functions provided by a single constituent element according to the above-described embodiments may be implemented by a plurality of constituent elements. A single function provided by a single constituent element may be implemented by a plurality of constituent elements. In addition, a plurality of functions provided by a plurality of constituent elements may be implemented by a single constituent element. A single function provided by a plurality of constituent elements may be implemented by a single constituent element. Furthermore, a part of a configuration according to the above-described embodiment may be omitted. Moreover, at least a part of a configuration according to an above-described embodiment may be added to or replace a configuration according to another of the above-described embodiments.

The present disclosure can also be implemented by various modes in addition to the above-described radar apparatus 1, such as a system in which the radar apparatus 1 is a constituent element, a program for enabling a computer to function as the radar apparatus 1, a non-transitory computer-readable (tangible) storage medium such as a semiconductor memory that stores the program therein, and a contamination determination method.

What is claimed is:

1. A radar apparatus comprising:
a transmission antenna unit that includes a plurality of transmission antennas;
an oscillation unit that is configured to generate a common signal that is a continuous wave;
a modulation unit that is configured to generate a plurality of transmission signals to be inputted to the plurality of transmission antennas by performing a predetermined modulation on each of a plurality of branched signals obtained by branching the common signal into a same number as the number of transmission antennas;
a reception antenna unit that includes a plurality of reception antennas;
a processing unit that is configured to detect each target object reflecting the transmission wave from the transmission antenna based on a plurality of signal components corresponding to the plurality of transmission signals respectively extracted from a plurality of reception signals received by the reception antenna unit; and
a radome that covers and protects from outside an opening surface of the plurality of transmission antennas and the plurality of reception antennas, wherein
a virtual array having a plurality of virtual reception antennas is formed by the plurality of transmission antennas and the plurality of reception antennas, and
the processing unit includes
a wavenumber calculation unit that calculates a wavenumber of incoming waves reflected from the target object for each of the detected target objects,
a wavenumber evaluation value calculation unit that is configured to calculate, as a wavenumber evaluation value, a proportion of target objects of which the wavenumber calculated by the wavenumber calculation unit is plural among the all of the detected target objects,
a false azimuth evaluation value calculation unit that is configured to calculate, as a false azimuth evaluation value, a proportion of target objects including a second incoming wave of which an azimuth difference relative to an azimuth of a first incoming wave of which power of the incoming wave is maximum power is a specific azimuth difference occurring due to periodic signal errors being superimposed on the virtual array, among the target objects of which the wavenumber calculated by the wavenumber calculation unit is plural, and
a contamination determining unit that is configured to determine contamination of the radome based on the wavenumber evaluation value and the false azimuth evaluation value.

2. The radar apparatus according to claim 1, wherein:
the contamination determining unit includes
a contamination determination value updating unit that updates a contamination determination value by increasing in response to the wavenumber evaluation value and the false azimuth evaluation value being respectively equal to or greater than thresholds set in advance and decreasing otherwise, and is configured to determine that the radome is contaminated in response to the contamination determination value being equal to or greater than a predetermined value, and further
a threshold value setting unit that switches at least either of the thresholds for the wavenumber evaluation value and the false azimuth evaluation value so that contamination of the radome is easily determined in response to outside temperature being a low temperature equal to or lower than a predetermined temperature or in response to a heater that heats a member in the vicinity of the radar apparatus being driven.

* * * * *